(12) United States Patent
Ghobary et al.

(10) Patent No.: US 6,660,781 B1
(45) Date of Patent: Dec. 9, 2003

(54) PROCESS FOR PREPARING POLYURETHANE FOAM

(75) Inventors: Hassan El Ghobary, Geneva (CH); Louis Muller, Divonne-les-Bains (FR)

(73) Assignee: Witco Corporation, Greenwich, CT (US)

(*) Notice: Subject to any disclaimer, the term of this patent is extended or adjusted under 35 U.S.C. 154(b) by 0 days.

(21) Appl. No.: 09/225,550

(22) Filed: Jan. 5, 1999

(51) Int. Cl.⁷ .................................................. C08J 9/04
(52) U.S. Cl. ...................... 521/129; 521/114; 521/115; 521/130; 521/155; 521/170; 521/172; 521/174
(58) Field of Search ............................... 521/129, 114, 521/115, 130, 155, 170, 172, 174

(56) References Cited

U.S. PATENT DOCUMENTS

| | | |
|---|---|---|
| 3,385,806 A | 5/1968 | Critchfield et al. |
| 3,892,687 A | 7/1975 | Bechara et al. |
| 3,988,267 A | 10/1976 | Bechara et al. |
| 3,993,652 A | 11/1976 | Bechara et al. |
| 4,040,992 A | 8/1977 | Bechara et al. |
| 4,086,213 A | 4/1978 | Bechara et al. |
| 4,101,465 A | 7/1978 | Lockwood et al. |
| 4,116,879 A | 9/1978 | Bechara et al. |
| 4,165,412 A | 8/1979 | Bechara et al. |
| 4,204,062 A | 5/1980 | Bechara et al. |
| 4,211,849 A | 7/1980 | Kollmeier et al. |
| 4,232,152 A | 11/1980 | Bechara et al. |
| 4,286,072 A | 8/1981 | McEntire et al. |
| 4,366,084 A | 12/1982 | Arbir et al. |
| 4,419,461 A | 12/1983 | Arbir et al. |
| 4,421,869 A | 12/1983 | Arbir et al. |
| 4,450,246 A | 5/1984 | Jachimowicz |
| 4,469,653 A | 9/1984 | Nissen et al. |
| 4,563,484 A | 1/1986 | Jachimowicz |
| 4,582,861 A | 4/1986 | Galla et al. |
| 4,617,286 A | 10/1986 | Arai et al. |
| 4,701,474 A | 10/1987 | Bailey, Jr. et al. |
| 4,758,605 A | 7/1988 | Williams |
| 4,780,485 A | 10/1988 | Ashida |
| 4,785,025 A | 11/1988 | Galla et al. |
| 4,785,027 A | 11/1988 | Brasington et al. |
| 5,179,131 A | 1/1993 | Wujcik et al. |
| 5,240,970 A | 8/1993 | Nichols et al. |
| 5,252,624 A | 10/1993 | Milliren et al. |
| 5,288,833 A | 2/1994 | Parodi et al. |
| 5,288,864 A | 2/1994 | Nichols et al. |
| 5,304,578 A | 4/1994 | Tamano et al. |
| 5,308,882 A | 5/1994 | Washington |
| 5,308,883 A | * 5/1994 | Londrigan et al. ........... 521/125 |
| 5,317,075 A | * 5/1994 | Dewhurst et al. ........... 521/129 |
| 5,321,050 A | 6/1994 | Morimoto et al. |

FOREIGN PATENT DOCUMENTS

| | | |
|---|---|---|
| CA | 651638 | 11/1962 |
| EP | 0088377 | 9/1983 |
| EP | 0140480 | 5/1985 |
| EP | 0276956 | 8/1988 |
| EP | 0361937 | 4/1990 |
| EP | 0484749 | 5/1992 |
| EP | 0585636 | 3/1994 |
| EP | 0656383 | 6/1995 |
| GB | 897167 | 10/1961 |
| GB | 1541593 | 3/1979 |
| JP | 53-28696 | 3/1978 |
| JP | 53-71197 | 6/1978 |

OTHER PUBLICATIONS

Fondots, "Developments in Amine Catalysts for Urethane Foam", J. Cellular Plastics, 1975, pp. 250–255.

* cited by examiner

Primary Examiner—John M. Cooney, Jr.
(74) Attorney, Agent, or Firm—Scully, Scott, Murphy & Presser

(57) ABSTRACT

A process for preparing a polyurethane foam, especially according to the one-shot foaming process the quasi-prepolymer process and the prepolymer process, by reactions between a polyisocyanate and an active hydrogen-containing component including water and an organic polyol wherein said reactions are conducted in the presence of a reaction product formed by reaction between a tertiary amnine and an aryloxy substituted carboxylic acid.

14 Claims, No Drawings

PROCESS FOR PREPARING POLYURETHANE FOAM

BACKGROUND OF THE INVENTION

1. Field of the Invention

This invention relates to a process for producing polyurethane foam. The invention is especially adapted for making polyurethane foam using the one-shot foaming process, the quasi-prepolymer process and the prepolymer process. The invention specifically relates to using a reaction product of a tertiary amine and an aryloxy substituted carboxylic acid having optional hydroxyl functionality as a catalyst for promoting reactions involved in the production of polyurethanes, preferably one-shot polyurethanes, and particularly flexible polyurethane foams.

2. Background

Polyurethane foams are produced by reacting a di- or polyisocyanate with compounds containing two or more active hydrogens, generally in the presence of catalysts, silicone-based surfactants and other auxiliary agents. The active hydrogen-containing compounds are typically polyols, primary and secondary polyamines, and water. Two major reactions are promoted by the catalysts among the reactants during the preparation of a polyurethane foam. These reactions must proceed simultaneously and at a competitively balanced rate during the process in order to yield a polyurethane foam with desired physical characteristics.

Reaction between the isocyanate and the polyol or polyamine, usually referred to as the gel reaction, leads to the formation of a polymer of high molecular weight. This reaction is predominant in foams blown exclusively with low boiling point organic compounds. The progress of this reaction increases the viscosity of the mixture and generally contributes to crosslink formation with polyfunctional polyols. The second major reaction occurs between isocyanate and water. This reaction adds to urethane polymer growth, and is important for producing carbon dioxide gas which promotes foaming. As a result, this reaction often is referred to as the blow reaction. The blow reaction is essential for avoiding or reducing the use of auxiliary blowing agents.

Both the gel and blow reactions occur in foams blown partially or totally with carbon dioxide gas. In fact, the in-situ generation of carbon dioxide by the blow reaction plays an essential part in the preparation of "one-shot", water blown polyurethane foams. Water-blown polyurethane foams, particularly flexible foams, are produced by both molded and slab foam processes.

As noted above, in order to obtain a good urethane foam structure, the gel and blow reactions must proceed simultaneously and at optimum balanced rates. For example, if the carbon dioxide evolution is too rapid in comparison with the gel reaction, the foam tends to collapse. Alternatively, if the gel extension reaction is too rapid in comparison with the blow reaction generating carbon dioxide, foam rise will be restricted, resulting in a high-density foam. Also, poorly balanced crosslinking reactions will adversely impact foam stability. In practice, the balancing of these two reactions is controlled by the nature of the promoters and catalysts, generally amine and/or organometalfic compounds, used in the process.

Flexible and rigid foam formulations usually include a polyol, a polyisocyanate, water, optional low boiling organic or inert gas ($CO_2$) a silicone type surfactant, and catalysts. Flexible foams are generally open-celled materials, while rigid foams usually have a high proportion of closed cells.

Historically, catalysts for producing polyurethanes have been of two general types: tertiary amines (mono and poly) and organo-tin compounds. Organometallic tin catalysts predominantly favor the gelling reaction; while amine catalysts exhibit a more varied range of blow/gel balance. Using tin catalysts in flexible foam formulations also increases the quantity of closed cells contributing to foam tightness. Tertiary amines also are effective as catalysts for the chain extension reaction and can be used in combination with the organic tin catalysts. For example, in the preparation of flexible slabstock foams, the "one-shot" process has been used wherein triethylenediarine is employed for promoting the water-isocyanate reaction and the cross-linking reaction; while an organic tin compound is used in synergistic combination to promote the chain extension reaction.

Flexible polyurethane foams are commercially prepared as slabstock foam or in molds. Some slabstock foam is produced by pouring the mixed reactants in large boxes (discontinuous process), while other foam is prepared in a continuous manner by deposition of the reacting mixture on a paper lined conveyor. The foam rises and cures as the conveyor advances and the foam is cut into large blocks as it exits the foam machine. Some of the uses of flexible slabstock polyurethane foams include: furniture cushions, bedding, and carpet underlay.

In discontinuous processes, the initiation of the reaction must be delayed to allow uniform laydown of the reacting mixture and allow excess air entrapped during reactant mixing to escape. Otherwise, foam splitting caused by the tardy release of such entrapped air may occur. In such situations, delayed action catalysts can be used to achieve the required reactivity profile. The problem also can be acute with slabstock foam produced by the continuous process on a machine with a short conveyor. In this case, the formulation has to be highly catalyzed in order to be sufficiently cured when the foam reaches the cutting saw. Thus, not only is delayed action necessary for a uniform laydown, but once activated, rapid catalytic action is critical.

The process for making molded foams typically involves the mixing of the starting materials with polyurethane foam production machinery and pouring the reacting mixture, as it exits the mix-head, into a mold. The principal uses of flexible molded polyurethane foams are: automotive seats; automotive headrests and armrests; and also in furniture cushions. Some of the uses of semi-flexible molded foams include automotive instrument panels, energy managing foam, and sound absorbing foam.

Modern molded flexible and semi-flexible polyurethane foam production processes have enjoyed significant progress. Processes such as those used in Just-in-Time (JIT) supply plants have increased the demand for rapid demold systems. Gains in productivity and/or reduced part cost result from reduced cycle times. Rapid cure High Resilience (HR) molded flexible foam formulations typically achieve demold times of three minutes. This is accomplished by using one, or a combination of the following: a higher mold temperature, more reactive intermediates (polyols and/or isocyanate), or increasing the quantity and/or the activity of the catalysts.

High reactivity molded polyurethane systems give rise to a number of problems, however. The fast initiation times require that the reacting chemicals be poured into a mold quickly. In some circumstances a rapid build-up of the viscosity of the rising foam causes a deterioration of its flow properties and can result in defects in the molded parts. Additionally, rapidly rising foam can reach the parting line of the mold cavity before the cover has had the time to close resulting in collapsed areas in the foam. In such situations, delayed action catalysts potentially can be used to improve the initial system flow and allow sufficient time to close the mold. Delayed action catalysts which exhibit high catalytic activity following activation are especially useful.

Another difficulty experienced in the production of molded foams, which is usually worse in the case of rapid cure foam formulations, is foam tightness. Foam tightness is caused by a high proportion of closed cells at the time the molded foam part is removed from the mold. If left to cool in that state, the foam part will generally shrink irreversibly. A high proportion of open cells also are required if the foam is to have a desired high resiliency. Consequently, foam cells have to be opened either by physically crushing the molded part or inserting it in a vacuum chamber. Many strategies have been proposed, both chemical and mechanical, to minimize the quantity of closed cells at demold.

The principal uses of rigid polyurethane foam are: pour-in-place insulation foams for refrigeration applications, transportation applications, and metal doors, boardstock insulation, and sprayed insulation. In rigid foam applications, delayed action catalysts can also find use for the same reasons needed in flexible foam molding, to delay the initial system reactivity while offering the short cure times required for fast production cycles.

Delayed action catalysts are expected to find their main application in the manufacture of molded flexible and semi-flexible polyurethane foam parts. In such applications, it is desirable to make the molding time as short as possible ("rapid demold"), but the onset of the reaction must be delayed so that the viscosity increase accompanying the reaction does not jeopardize proper mold filling. Foams of a desired density can be obtained, particularly with MDI and MDV/TDI systems, from the delayed onset of viscosity build-up leading to better expansion of the reacting mixture.

Historically, delayed action catalysts used in the above-described processes are acid-blocked amines, usually simple amine salts of a tertiary amine and a carboxylic acid such as formic acid, acetic acid, or 2-ethylhexanoic acid (*J. Cellular Plastics*, p. 250–255, September/October, 1975). The salts are not catalytically active and, as a consequence, the amines do not activate the reaction until the salt is dissociated by the increasing temperature of the reacting mixture. Unfortunately, using carboxylic acid blocked amine catalysts generally has a tightening effect on the foam (see U.S. Pat. Nos. 3,385,806, 4,701,474, and 4,785,027).

In the production of TDI molded foam, such as for automotive cushions, grafted polyether polyol is mixed with polyether polyol in order to obtain the desired foam hardness. Hardness often is a major limiting factor for density reduction. Because conventional delayed action, acid blocked amine catalysts (i.e., amine salts of formic, acetic, propionic and 2-ethylhexanoic acids) produce foams with lower final hardnesses, such catalysts are ill-suited for making lower density grade TDI molded foam.

The recent, remarkable progress made by major polyol producers to produce higher reactivity polyols, which has led to accelerated TDI molded foam curing, highlights the need for new delayed action catalysts. The high reactivity polyols tend to produce tighter foams. Since conventional delayed action acid-blocked amine catalysts also give tight foams, their conjoint use with the newer polyol exacerbates the tightness problem. Indeed, it becomes difficult to crush the foam without destroying the foam structure.

There remains a need in the polyurethane industry, therefore, for catalysts that have a delayed action; so as to delay the onset of the isocyanate-polyol reaction, referred to as the "initiation time", without adversely impacting the time to complete the reaction or cure, while avoiding some of the other problems common to known delayed action catalysts. There is especially a need in the polyurethane industry for delayed catalysts which can accommodate improved foam hardnesses, particularly for the low density grade TDI molded foams, and which can improve foam openness.

3. Description of Related Art

The use of acid-grafted polyether polyols as reactivity controllers for the production of polyurethane foams is disclosed in U.S. Pat. No. 4,701,474. Such acid-grafted polyether polyols purportedly reduce the reactivity of polyurethane foam formulations without the tightening effect which usually results from using carboxylic acid-amine salts. The number average molecular weight range claimed for the disclosed acid-grafted polyether polyols is 1,000 to 10,000.

Preparing polyurethane foams in the presence of polyether acids is disclosed in U.S. Pat. No. 4,785,027. The polyether acids are mono- or di-acids with the acid functional groups located at the ends of the polymer chains. The polyether chain is built from ethylene and/or propylene oxide to have repeating oxyalkylene groups. In the case of mono acids, the other terminal group can be an alkyl or hydroxyl function. The presence of the hydroxyl functional group is optional. Such polyether acids purportedly delay the initial reaction rate without increasing foam tightness observed with formic acid-amine salts. It is stated that the system has an advantage over systems based on formic acid in that the polyurethane foam is not tight and does not suffer from skin peeling.

In U.S. Pat. No. 4,366,084 the fuming of dimethylaminopropylamine (DMAPA) is reduced by blocking the amine with phenol. The reduction in fuming increases directly with the percent blocking. According to the patent, using the DMAPA-phenol salts at varied blocking ratios does not cause any deterioration in the air flow and compression set properties of the foam.

U.S. Pat. No. 5,179,131 discloses that the addition of mono- or dicarboxylic acids to polyurethane foam formulations made using polyisocyanate polyaddition polymer polydispersions results in a reduction in foam shrinkage. The functional groups attached to the acid are either alkyl or alkylene.

The use of the amine salts of tertiary amino-acids as delayed action catalysts in the production of polyurethanes is disclosed in U.S. Pat. No. 4,232,152.

The use of particular N-hydroxyalkyl quaternary ammonium carboxylate salts as delayed action catalysts for the production of polyurethane is disclosed in U.S. Pat. Nos. 4,040,992 and 4,582,861 and EP Pat. No. 0 484 749.

The use of particular aliphatic tertiary monoamines, and the carboxylic acid salts thereof as catalysts, in the production of polyurethane foam is disclosed in U.S. Pat. Nos. 4,450,246 and 4,617,286; U.K. Pat. No. 879,167 and in Canadian Pat. No. 651,638. A variety of organic mono or dicarboxylic acids are disclosed. Canadian Pat. 651,638, describes preparing polyurethane foams from an isocyanate-terminated polytetramethyleneether or polypropyleneether polyurethane prepolymer and water, in the presence of an acid-amine salt. In certain examples, salts of the hydroxy-acid, citric acid and either N-methyl morpholine or triethylamine are specifically exemplified. U.K. Pat. 879,167 describes using a tertiary amine salt of lactic acid.

U.S Pat. No. 2,932,621 discloses the use of dimethylethanolamine salts of dicarboxylic acids (such as oxalic acid) as a catalyst in the preparation of polyurethane foam.

U.S Pat. No. 3,728,291 describes the use of triethylenediamine (TEDA) salts of formic acid in combination with 1-(2-hydroxypropyl) imidazole as a catalyst to permit wider tin latitude in the preparation of polyurethane foams.

U.S Pat. Nos. 3,862,150 and 4,165,412 discloses the use of tertiary amines and substituted carboxylic acids as catalysts in preparing polyurethane foams. The acid must have a carboxyl group at one end of the molecule and a group selected from CN, SO, $SO_2$, CO, $NO_2$, $COCH_3$ and CO-phenyl on the other end. An example is the salt of TEDA and cyanoacetic acid.

European Pat. No. 0,088,377 discloses a method for producing carbamate and carbonate salts of tertiary aninines which comprises admixing secondary and tertiary amines in the presence of carbon dioxide.

European Pat. No. 0,361,937 discloses the use of carboxylic acid salts to slow down the reaction between aminated polyether polyols and isocyanate, so that effective foaming can take place before the reaction is completed.

European Pat. No. 0,140,480 discloses the use of monocarboxylic acid salts of bis-(aminoethyl) ether derivatives as catalysts for the preparation of polyurethane foams.

More recently, it was discovered that salts of a tertiary amine and a carboxylic acid with hydroxyl functionality could advantageously be used as a delayed action catalyst for promoting reactions involved in the production polyurethanes, including one-shot polyurethanes, and particularly flexible polyurethane foams. This technology is described in U.S. Pat. No. 5,489,618 and E.P. Pat. No. 0 656 383. The use of such amine salts results in the manufacture of polyurethane foams which are either more open or more easily opened, or both.

DETAILED DESCRIPTION

The present invention is based on the discovery that the reaction product of a tertiary amine and an aryloxy substituted carboxylic acid with optional hydroxyl functionality ("phenoxy acids") can be used as a delayed action catalyst for producing polyurethane foams, especially foams produced using the one-shot foaming process, the quasi-prepolymer process and the prepolymer process and that the use of such amine catalysts offers significant advantages over known delayed action catalysts.

Use of the amine and "phenoxy acid" reaction products, such as in the one-shot foaming technique, unexpectedly results in the production of high resiliency (HR) flexible TDI foams having improved hardnesses. The polyurethane reaction kinetics are controlled by the use of such delayed action catalysts. The time elapsed from the mixing of the reactants to the initiation of the foam forming reaction is extended, improving the processing. Another advantage of the delayed catalytic action of the phenoxy acid-based amine catalysts is improved flow of the reacting mixture and the production of more open or more easily to open foam.

This invention broadly relates to a process for making flexible and semi-flexible polyurethane foams and for making rigid polyurethane foams. The invention is especially suitable for making flexible, semi-flexible, and rigid foams using the one shot foaming process, the quasi-prepolymer process and the prepolymer process. In accordance with the present invention, the polyurethane reaction kinetics are controlled by including, in the foaming mixture, a delayed-action catalyst comprising the reaction product of a tertiary amine and an aryloxy substituted carboxylic acid with optional hydroxyl functionality. The polyurethane manufacturing process of the present invention typically involves the reaction of: an organic polyisocyanate; a polyol, generally a polyol having a hydroxyl number from about 15 to about 700, and one or more tertiary amine catalysts, at least one of which is the reaction product of a tertiary amine and an aryloxy substituted carboxylic acid with optional hydroxyl functionality. In addition to the previously indicated materials, flexible and semi-flexible foam formulations (hereinafter referred to simply as flexible foams) also generally include: water; an optional organic low boiling auxiliary blowing agent or an optional inert gas; a silicone surfactant; an optional tin catalyst, and an optional crosslinker(s) for stabilization or hardening. Rigid foam formulations often contain both a low boiling organic material or an inert gas and water for blowing.

The "one shot foam process" for making polyurethane foam is a one-step process in which all of the ingredients necessary (or desired) for producing the foamed polyurethane product including the polyisocyanate, the organic polyol, water, catalysts, surfactant(s), optional blowing agents and the like are simply blended together, poured onto a moving conveyor or into a mold of a suitable configuration and cured. The one shot process is to be contaasted with the prepolymer process wherein a liquid prepolymer adduct of a polyisocyanate and a polyol normally having terminal isocyanate groups first is prepared in the absence of any foam-generating constituents and then the prepolymer is reacted with water in the presence of catalyst in a second step to form the solid urethane polymer.

Aryloxy substituted carboxylic acids useful for preparing the amine catalysts according to the subject invention have the general formula:

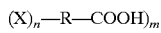

$(X)_n$—R—$(COOH)_m$

Where R is an optionally hydroxyl substituted, at least divalent hydrocarbon moiety, typically an optionally hydroxyl substituted at least divalent linear or branched aliphatic hydrocarbon moiety and/or an optionally hydroxyl substituted at least divalent alicyclic or aromatic hydrocarbon moiety; X is an optionally substituted aryloxy group of the formula Ar—O— where Ar is an optionally substituted aryl group, i.e., a monocyclic or bicyclic aromatic hydrocarbon ring system, typically an optionally substituted phenyl or naphthyl and preferably an optionally substituted phenyl; n is an integer having a value of at least 1 and allows for mono and poly substitution of an aryloxy group on the hydrocarbon moiety and m is an integer having a value of at least 1 and allows for mono and polycarboxyl substitution on the hydrocarbon moiety. Generally, m and n will independently have a value of from 1 to 4.

The "optionally hydroxyl substituted at least divalent hydrocarbon moiety" can be an optionally hydroxyl substituted saturated or unsaturated hydrocarbon moiety of 1 to 20 carbon atoms, including an optionally hydroxyl substituted linear aliphatic hydrocarbon moiety, an optionally hydroxyl substituted branched aliphatic hydrocarbon moiety, an optionally hydroxyl substituted alicyclic hydrocarbon moiety or an optionally hydroxyl substituted aromatic hydrocarbon moiety, each optionally substituted with one or more hydroxyl groups. Stated otherwise, R can, for example, be a linear, or branched alkylene group of 1 to 20 carbon atoms, a cyclic alkylene group of 4 to 10 carbon atoms, or an arylene, an alkarylene, or an aralkylene group of 6 to 20 carbon atoms. Specific non-limiting examples of suitable hydrocarbon moieties are methylene, ethylene, 1,1-propylene, 1,3-propylene, 1,1-butylene, 1,4-butylene, 1,1-amylene, 1,10-decylene, 2-ethylhexylene, o-, m-, p-phenylene, ethyl-p-phenylene 2,5-naphthylene, p,p'-biphenylene, cyclopentylene, cycloheptylene, xylylene, 1,4-dimethylenephenylene and the like. Those skilled in the art will readily appreciate the wide variety of available hydrocarbon moieties. While the above-noted radicals have two available substitution sites, at least one for a carboxyl group and one for an optionally substituted aryloxy group, it is contemplated that additional hydrogens on the hydrocarbon could be replaced with further optionally substituted aryloxy groups and/or carboxyl groups and with optional hydroxyl groups.

As noted above, the optionally substituted aryloxy group has the formula Ar—O— where Ar is an optionally substituted aryl group including an optionally substituted phenyl or naphthyl moiety. As used throughout this specification and claims, "optionally substituted" when used in connection with the aryloxy group means that the aryl group is optionally substituted at one or more substitutable positions with an alkoxy, with a carboxyl, with hydroxyl, with a halogen including chlorine, bromine, fluorine and combinations thereof, with an alkyl group, i.e. a straight or branched chain saturated hydrocarbon group of 1 to 10 carbon atoms, which itself can be substituted with a halide, a hydroxyl, an alkoxy, a carboxyl and combinations thereof; and/or with a phenyl group, which itself can be substituted with a halide, a hydroxyl, an alkoxy, a carboxyl and combinations thereof. The following phenoxy acids are illustrative of compounds suitable for practicing the present invention: phenoxyacetic acid, (dichlorophenoxy)acetic acid, phenoxybenzoic acid, chloromethylphenoxyacetic acid, 5-(4-hydroxymethyl-3-methoxyphenoxy) valeric acid, naphthoxyacetic acid, 4-hydroxymethyl phenoxyacetic acid, 3-(4-hydroxymethylphenoxy) propionic acid, phenoxy butyric acid, 2-(4-hydroxymethyl-3-methoxy phenoxy) butryic acid, 4-(4-hydroxymethyl-3-methoxyphenoxy) butyric acid, 4-(4-hydroxymethyl-3-methoxyphenoxyacetic acid and mixtures thereof. Phenoxy acids useful in the practice of the present invention generally have molecular weights below about 300, and more often below about 250.

Tertiary amines used to form a reaction product with the above-described phenoxy acids can be any of the tertiary amines used for catalyzing the reactions of isocyanate with compounds containing active hydrogens. Suitable tertiary amines include dimethylaminoethanol, dimethylaminoethoxyethanol, triethyl amine, N,N-dimethylcyclohexylamine (DMCHA), N,N,N',N'-tetramethylethylenediamine, N,N-dimethylaminopropylamine, N,N,N',N',N"-pentamethyldipropylenetriamine, tris(3-dimethylaminopropyl)amine, N,N-dimethylpiperazine, tetramethylimino-bis(propylamine), dimethylbenzylamine, trimethylamine, triethanolaamine, N-diethyl-ethanolamine, N-methylpyrrolidone, N-vinyl-pyrrolidone, N-methylmorpholine, N-ethylmorpholine, bis(2-dimethylamino-ethyl)ether, N,N,N',N',N"-pentamethyl-diethylenetriamine, 1,4-diazabicyclo[2.2.2]octane, 1,8-diaza[5.4.0]bicycloundec-7-ene, 1,2-dimethylirnidazole, 3-(dimethylamino)propylimidazole and mixtures thereof By including the amine catalyst of the present invention in the polyurethane reaction mixture, the initiation of the foaming reaction is delayed. Time to full cure, however, is not adversely affected. Furthermore, several surprising results are obtained, especially when using the disclosed amine catalysts for making flexible foams using the one-shot foaming process. Certain unexpected advantages realized upon using the reaction product of an amine and a phenoxy acid include: (1) production of flexible foam with improved hardness; (2) a more open or more easily opened cell structure, (e.g., significant reduction in the force required to open the cells of flexible foams by mechanical crushing); and (3) reduced foam shrinkage.

The reaction products of the tertiary amines and the phenoxy acids can be prepared simply by mixing the amine and the acid in a suitable organic solvent or an aqueous solvent, especially water. Preferable organic solvents are ethylene glycol, diethylene glycol, propylene glycol, and dipropylene glycol. Among the cited solvents, most frequently used are water, diethylene glycol and ethylene glycol. The phenoxy acid also may be added to the resin premix consisting of all the formulation components, including a tertiary amine and except the polyisocyanate, or the acid and amine could be separately added to the foam mixture for in situ formation of the amine catalyst in the resin during the polymerization. Neutralization of the tertiary amine in the resin premix by the phenoxy acid is a fast process. The blocked catalyst may be an equilibration mixture of different phenoxy acids and amines. The addition of the reaction product of an amine and a phenoxy acid to a resin formulation may result in a solution or a stable dispersion.

The amine catalysts of the present invention may be the sole catalyst used in the polyurethane production process, or more usually, is used in combination with one or more other catalysts, such as tertiary amines, organic tin catalysts, alkali metal or alkaline earth metal carboxylate catalysts, other delayed action catalysts, or other known polyurethane catalysts. Depending on the tertiary amine used in the formulation, the quantity of phenoxy acid reacted with the amine can be adjusted to achieve the desired reactivity, such as the initiation delay, and reactivity profile during polyurethane formulation. Typically, desired catalyst compositions will contain both free amine and bound amine in the form of the amine and phenoxy acid reaction product. Acid exchange equilibrium is expected to occur if there is more than one amine present. Based on acid-base equivalents, the amount of the amine salt generally will be between about 2% to 75% of the total amine equivalents in the formulation. A preferred quantity of amine present as the reaction product in a resin formulation typically will be between about 5% and 75% of the total tertiary amine content on an equivalents basis and still more preferably, between about 5% and 50%. As used in this specification, the phrase "blocking percentage" means the molar equivalent of tertiary acid divided by the molar equivalent of tertiary amine multiplied by one hundred.

Polyols which are useful in the process of the invention for making a polyurethane, particularly via the one-shot foaming procedure, are any of the types presently employed in the art for the preparation of flexible slabstock foams, flexible molded foams, semi-flexible foams, and rigid foams. The polyols, including polyether polyols and polyester polyols, normally can have hydroxyl numbers in the range of about 15 to about 700. The hydroxyl numbers are preferably between 20 to 60 for flexible foams, between 100 and 300 for semi-flexible foams and between 250 and 700 for rigid foams. The hydroxyl number is defined by the equation:

$$OH\# = \frac{56{,}100 \times f}{m.w}$$

where:

OH#=hydroxyl number of the polyol.

f=functionality, that is, the average number of hydroxyl groups per molecule of polyol.

m.w=number average molecular weight of the polyol.

For flexible foams the preferred functionality of the polyols is 2 to 4 and most preferably 2.3 to 3.5. For rigid foams the preferred functionality is 2 to 8 and most preferably 3 to 5.

Polyols which can be used in the process of the present invention, either alone or in admixture, can be of the following non-limiting classes:

a) alkylene oxide adducts of polyhydroxyalkanes;

b) alkylene oxide adducts of non-reducing sugars and sugar derivatives;

c) alkylene oxide adducts of phosphorous and polyphosphorous acids;

d) alkylene oxide adducts of polyphenols;

e) alkylene oxide adducts of primary and secondary amines.

For flexible foams, a preferred types of alkylene oxide adducts of polyhydroxyalkanes are the ethylene oxide and propylene oxide adducts of trihydroxyalkanes. For rigid foams, the preferred types of alkylene oxide adducts are the ethylene oxide and propylene oxide adducts of ammonia, toluene diamine, sucrose, and phenol-formaldehyde-amine resins (Mannich bases).

Grafted or polymer polyols are used extensively in the production of flexible foams and are a preferred class of polyols useful in the process of this invention. Polymer polyols are polyols that contain a stable dispersion of a polymer, for example in the polyols a) to e) above and more preferably the polyols of type a). Other polymer polyols useful in the process of this invention are polyurea-polyols and polyoxamate-polyols.

The polyisocyanates which are useful in the process of this invention are organic compounds that contain at least two isocyanate groups and generally will be any of the known aromatic or aliphatic polyisocyanates. Suitable organic polyisocyanates include the hydrocarbon diisocyanates, (e.g. the alkylenedilsocyanates and the arylene dilsocyanates), such as methylene diphenyl diisocyanate (MDI) and 2,4- and 2,6-toluene diisocyanate (TDI), as well as known triisocyanates and polymethylene poly (phenylene isocyanates) also known as polymeric or crude MDI. For flexible and semi-flexible foams, the preferred isocyanates generally are: mixtures of 2,4-toluene dilsocyanate and 2,6-toluene diisocyanate (TDI) in proportions by weight of 80% and 20% respectively and also 65% and 35% respectively; mixtures of TDI and polymeric MDI, more preferably in the proportion by weight of 80% TDI and 20% of crude polymeric MDI and 50% TDI and 50% crude polymeric MDI; and all polyisocyanates of the MDI type. For rigid foams, the preferred isocyanates are: polyisocyanates of the MDI type and more preferably crude polymeric MDI.

The amount of polyisocyanate included in the foam formulations used relative to the amount of other materials in the formulations is described in terms of "Isocyanate Index". "Isocyanate Index" means the actual amount of polyisocyanate used divided by the theoretically required stoichiometric amount of polyisocyanate required to react with all the active hydrogen in the reaction mixture multiplied by one hundred (100) [see Oertel, Polyurethane Handbook, Hanser Publishers, New York, N.Y. (1985)]. The Isocyanate Indices in the reaction mixtures used in the process of this invention generally are between 60 and 140. More usually, the Isocyanate Index is: for flexible TDI foams, typically between 85 and 120; for molded TDI foams, normally between 90 and 105; for molded MDI foams, most often between 70 and 90; and for rigid MDI foams, generally between 90 and 130. Some examples of polyisocyanurate rigid foams are produced at indices as high as 250–400.

Water often is used as a blowing agent in both flexible and rigid foams. In the production of flexible slabstock foams, water generally can be used in concentrations of between 2 to 6.5 parts per hundred parts of polyol (phpp), and more often between 3.5 to 5.5 phpp. Water levels for TDI molded foams normally range from 3 to 4.5 phpp. For MDI molded foam, the water level is more normally between 2.5 and 5 phpp. Rigid foam water levels range from 0.5 to 5 parts, and more often from 0.5 to 1 phpp.

Blowing agents based on volatile hydrocarbons or halogenated hydrocarbons and other inert gases can also be used in the production of polyurethane foams in accordance with the present invention. A significant proportion of the rigid insulation foam produced is blown with halogenated hydrocarbons. The preferred organic blowing agents for rigid foams are the halogenated hydrocarbons, and more preferably the hydrochlorofluorocarbons (HCFC), the chlorofluorocarbons (CFC), pentane and cyclopentane. In the production of flexible slabstock foams, water is the main blowing agent; however, other blowing agents can be used as auxiliary blowing agents. For flexible slabstock foams, the preferred auxiliary blowing agents are the CFC's and chlorohydrocarbons, and more preferably trichloromonofluoromethane (CFC-11) and dichloromethane (methylene chloride); though there is a growing interest in using carbon dioxide for both flexible slabstock and flexible molded foam.

Flexible molded foams typically do not use an inert, auxiliary blowing agent, and in any event incorporate less auxiliary blowing agents than slabstock foams. MDI molded foams in Asia and in some developing countries use methylene chloride, CFC-11 and other blowing agents. The quantity of blowing agent varies according to the desired foam density and foam hardness as recognized by those skilled in this art. When used, the amount of hydrocarbon-type blowing agents varies from a trace amount up to about 50 parts per hundred parts of polyol (phpp) and $CO_2$ from about 1 to 10%.

Catalysts that can be used for the production of polyurethanes in addition to the amine-phenoxy acid salts of the present invention include tertiary amines of both the non-reactive (fugitive) and reactive types. Reactive amine catalysts are compounds which contain one or more active hydrogens and, as a consequence, can react with the isocyanate and be chemically bound in the polyurethane polymer matrix. For the production of flexible slabstock and molded foams, the preferred amine catalysts are bis(N,N-dimethylaininoethyl)ether and 1,4-diazabicyclo[2.2.2] octane. For the production of rigid foams, the preferred amine catalysts are dimethylcyclohexylamine (DMCHA) and dimethylethanolamine (DMEA).

Organometallic catalysts or metal salt catalysts also can and often are used in polyurethane foam formulations. For flexible slabstock foams, the generally preferred metal salt and organometallic catalysts are stannous octoate and dibutyltin dilaurate respectively. For flexible molded foams, the normally preferred organometallic catalysts are: dibutyltin dilaurate; and dibutyltindialkylmercaptide. For rigid foams the most often preferred metal salt and organometallic catalysts are potassium acetate, potassium octoate and dibutyltin dilaurate, respectively. Metal salt or organometallic catalysts normally are used in small amounts in polyurethane formulations, typically from about 0.001 phpp to about 0.5 phpp.

Crosslinkers also may be used in the production of polyurethane foams. Crossliikers are typically small molecules, usually less than 350 molecular weight, which contain active hydrogens for reaction with the isocyanate. The functionality of a crosslinker is greater than 3 and preferably between 3 and 5. The amount of crosslinker used can vary between about 0.1 phpp and 20 phpp and the amount used is adjusted to achieve the required foam stabilization or foam hardness. Examples include glycerine, diethanolamine, triethanolamine and tetrahydroxyethylethylenediamine.

Silicone surfactants which may be used in the process of this invention include: "hydrolysable" polysiloxane-polyoxyalkylene block copolymers; "non-hydrolysable" polysiloxane-polyoxyalkylene block copolymers; cyanoalkylpolysiloxanes; alkylpolysiloxanes; polydimethylsiloxane oils. The type of silicone surfactant used and the amount required depends on the type of foam produced as recognized by those skilled in the art. Silicone surfactants can be used as such or dissolved in solvents such as glycols. For flexible slabstock foams the reaction mixture usually contains from 0.1 to 6 phpp of silicone surfactant, and more often from 0.7 to 2.5 phpp. For flexible molded foam the reaction nuxture usually contains 0.1 to 5 phpp of silicone surfactant, and more often 0.5 to 2.5 phpp. For rigid foams the reaction mixture usually contains 0.1 to 5 phpp of silicone surfactant, and more often from 0.5 to 3.5 phpp. The amount used is adjusted to achieve the required foam cell structure and foam stabilization.

Temperatures useful for the production of polyurethanes vary depending on the type of foam and specific process used for production as well understood by those skilled in the art. Flexible slabstock foams are usually produced by mixing the reactants generally at an ambient temperature of between about 20° C. and 40° C. The conveyor on which the foam rises and cures is essentially at ambient temperature, which temperature can vary significantly depending on the geographical area where the foam is made and the time of year. Flexible molded foams usually are produced by mixing the reactants at temperatures between about 20° C. and 30° C., and more often between 20° C. and 25° C. The mixed starting materials are fed into a mold typically by pouring. The mold preferably is at a temperature between about 20° C. and 70° C., and more often between about 40° C. and 65° C. Sprayed rigid foam starting materials are mixed and sprayed at ambient temperature. Molded rigid foam starting materials are mixed at a temperature in the range of 20° C. to 35° C. The preferred process used for the production of flexible slabstock foams, molded foams, and rigid foams in accordance with the present invention is the "one-shot" process where the starting materials are mixed and reacted in one step.

The basic procedure used to mix the reactants and prepare laboratory foam pads for evaluation of foam properties was as follows:

1. The formulation ingredients are weighed in preparation for sequential addition to an appropriate mixing container (cardboard cup).

2. a premix of water, catalyst C-1 (1,4-diazabicylo[2.2.2]-octane), catalyst C-2 (an acid-blocked bis(dimethylaminoethyl)ether) and diethanolamine (DEOA) was prepared in an appropriate container.

3. a polyol, the premix, and a silicone surfactant are mixed throughly in the cardboard cup using a drill press at 2000 rpm.

4. The isocyanate was added and mixed with the other reactant ingredients.

5. The reacting mixture was poured into a 30×30×10 cm aluminum mold. The mold temperature was controlled at 65° C. (TDI) or 50° (MDI) by a thermostat-controlled hot water circulation. The mold lid had vent openings at the four corners.

Flexible free rise (slabstock) foam was made in a similar manner, except that stannous octoate was added after step 3 and mixing was continued for ten seconds before the addition of isocyanate and curing was at 110° C. for 15 minutes.

Table 1 provides measures of foam properties to permit comparison of reactivity, foam openness and foam hardness. Test methods used to measure the physical characteristics of the foam produced in the examples include the following:

| Physical Characteristic | Test Method |
| --- | --- |
| Density | ASTM D 3574 Test a |
| Cream Time | Cream time is the time elapsed, in seconds, from the addition of the isocyanate to the reaction mixture to the start of the foaming reaction. |
| Exit Time | Exit time is the time elapsed, in seconds, from the addition of the isocyanate to the reaction mixture to the first appearance of foam extrusion from the four vents of the mold. |
| Force-to-Crush | Force-to-crush (FTC) is the peak force required to deflect a foam pad with the standard 323 cm$^2$ (50 sq. in.) indentor, 1 minute after demold, to 50% of its original thickness. It is measured with a load testing machine using the same setup as that used for measuring foam hardness. a load tester crosshead speed of 50.8 cm/minute is used. The FTC value is a good relative measure of the degree of foam openness: the lower the value, the more open the foam |
| ILD | The indentation load deflection (ILD) is measured on the same pad used for the FTC measurement three days after demold. Following the FTC measurement, the foam pad is completely crushed by a mechanical crusher and kept at 22° C. and 50% relative humidity for at least three days to reach the foam's final hardness before the measurement of ILD at 50% compression is taken. |
| Ball Rebound | ASTM D3574, test H |
| CFD | ASTM 3574, test G |
| Air Flow | ASTM 3575, test G |
| Rise Time | Time elapsed from addition of isocyanate until final rise of foam |
| Top Collapse | height difference between maximum foam height and final foam height |

The terms and abbreviations used in the specification including the following examples have the following meaning:

| Term or Abbreviation | Meaning |
|---|---|
| Polyol OH 32 | highly reactive triol with 32 OH number |
| Polyol OH 24 | highly reactive grafted triol with 24 OH number |
| Polyol OH 28 | A reactive triol with 28 OH number |
| Polyol OH 30 | a reactive grafted triol with 30 OH number |
| C-1 | 1,4-diazabicyclo[2.2.2]-octane |
| C-2 | bis(2-dimethylaminoethyl)ether |
| C-3 | dimethylaminoethanol |
| C-4 | tetramethylimino bis (propylamine) |
| C-5 | N, N dimethylaminopropylamine |
| C-6 | dimethylaminoethoxyethanol |
| C-7 | N, N, N', N', N" pentamethyl dipropylenetriamine |
| Silicone Surfactant I, II | a silicone surfactants sold for use in high resiliency foam by OSI (Niax ™ L-2100 for Tables 1 and 3; Niax ™ L-3002 for Table 2). |
| TDI 80/20 | a mixture of 80 wt. % of 2,4-tolylene diisocyanate and 20 wt. % 2,6-tolylene diisocyanate |
| MDI | methylenediphenyldiisocyanate isomers and polymers, and blends thereof |
| DEOA | Diethanolamine |
| g | grams |
| s | seconds |
| min | minute |
| kg | kilograms |
| kPa | kiloPascal |
| m | meter |
| cm | centimeter |
| phpp | parts per hundred parts by weight of polyol |
| ° C. | degree Celsius |
| N | Newton |
| ILD | Indention Load Deflection |
| FTC | Force-to-crush (crushing force) |

While the scope of the present invention is defined by the appended claims, the following examples illustrate certain aspects of the invention and, more particularly, describe methods for evaluation. The examples are presented for illustrative purposes and are not to be construed as limitations on the present invention.

EXAMPLES 1–3

The foam in Example 1 employs an acetic acid blocked amine catalyst, and represents the reference foam and the conventional delayed action catalyst. Examples 2 and 3 illustrate the phenoxy acids: phenoxyacetic acid (Example 2) and 2,4-dichlorophenoxyacetic acid Example 3).

It is evident that the used of acid-blocked amine catalysts prepared from phenoxy acids, enhance the delay before the initiation of foaming reaction and slow down the start of the foaming reaction. The reported data also shows that openness and hardness of the foam made according to the present invention are substantially improved.

TABLE 1

| | Formulation, phpp | | |
|---|---|---|---|
| Examples | 1 | 2 | 3 |
| Polyether polyol (OH 32) | 70.000 | 70.000 | 70.000 |
| Polyether polymer polyol (OH 24) | 30.000 | 30.000 | 30.000 |
| Water | 4.000 | 4.000 | 4.000 |
| DEOA | 1.000 | 1.000 | 1.000 |
| Catalyst C-1 | 0.066 | 0.066 | 0.066 |
| Catalyst C-2 | 0.125 | 0.125 | 0.125 |
| acetic acid | 0.024 | — | — |
| phenoxyacetic acid | — | 0.060 | — |
| 2,4-dichlorophenoxyacetic acid | — | — | 0.087 |
| Silicone surfactant | 1.50 | 1.50 | 1.50 |
| TDI 80/20 (Index) | 100.000 | 100.000 | 100.000 |
| Cream time(s) | 6.000 | 6.500 | 7.000 |
| Exit time (s) | 23.000 | 29.000 | 30.000 |
| Density (kg/m3) | 35.800 | 35.800 | 35.200 |
| FTC (50%, N) | 594.000 | 284.000 | 260.000 |
| ILD (50%, N) | 422.000 | 468.000 | 469.000 |

EXAMPLES 4–15

Examples 4–15 (Table 2) presents the results of using several different amines for preparing the acid-blocked amine delayed action catalyst of the invention on foam properties. Phenoxyacetic acid was used as the acid in accordance with the invention; while acetic acid was used as the control for comparison. Foams were prepared using the procedures reported above. The increase in cream time and the exit time typical of the acid-blocked amines of the present invention were observed for all of the amines tested. The catalysts of the invention also generally produce more open (or more easily opened) foams with improved hardness relevant to the control with the amines tested.

TABLE 2

| | Formulation, phpp | | | | | | | | | | | |
|---|---|---|---|---|---|---|---|---|---|---|---|---|
| Examples | 4 | 5 | 6 | 7 | 8 | 9 | 10 | 11 | 12 | 13 | 14 | 15 |
| Polyether polyol (OH 28) | 100.000 | 100.000 | 100.000 | 100.000 | 100.000 | 100.000 | 100.000 | 100.000 | 100.000 | 100.000 | 100.000 | 100.000 |
| Water | 4.000 | 4.000 | 4.000 | 4.000 | 4.000 | 4.000 | 4.000 | 4.000 | 4.000 | 4.000 | 4.000 | 4.000 |
| DEOA | 1.000 | 1.000 | 1.000 | 1.000 | 1.000 | 1.000 | 1.000 | 1.000 | 1.000 | 1.000 | 1.000 | 1.000 |
| Catalyst C-2 | 0.140 | 0.140 | 0.140 | 0.140 | 0.140 | 0.140 | 0.140 | 0.140 | 0.140 | 0.140 | 0.140 | 0.140 |
| Catalyst C-3 | 0.300 | 0.300 | — | — | — | — | — | — | — | — | — | — |
| Catalyst C-4 | — | — | 0.240 | 0.240 | — | — | — | — | — | — | — | — |
| Catalyst C-5 | — | — | — | — | 0.360 | 0.360 | — | — | — | — | — | — |
| Catalyst C-6 | — | — | — | — | — | — | 0.300 | 0.300 | — | — | — | — |
| Catalyst C-7 | — | — | — | — | — | — | — | — | 0.200 | 0.200 | 0.200 | 0.200 |
| Acetic acid | 0.061 | — | 0.690 | — | 0.085 | — | 0.041 | — | 0.054 | — | 0.054 | — |
| Phenoxyacetic acid | — | 0.154 | — | 0.175 | — | 0.214 | — | 0.103 | — | 0.136 | — | 0.136 |
| Blocking percentage* | 30.000 | 30.000 | 30.000 | 30.000 | 20.000 | 20.000 | 30.000 | 30.000 | 30.000 | 30.000 | 30.000 | 30.000 |
| Silicone surfactant | 1.000 | 1.000 | 1.000 | 1.000 | 1.000 | 1.000 | 1.000 | 1.000 | 1.000 | 1.000 | 1.000 | 1.000 |
| Polymeric MDI (index) | 70.000 | 70.000 | 70.000 | 70.000 | 70.000 | 70.000 | 70.000 | 70.000 | 70.000 | 70.000 | 80.000 | 80.000 |

TABLE 2-continued

| | Formulation, phpp | | | | | | | | | | | |
|---|---|---|---|---|---|---|---|---|---|---|---|---|
| Examples | 4 | 5 | 6 | 7 | 8 | 9 | 10 | 11 | 12 | 13 | 14 | 15 |
| Cream time(s) | 8.000 | 9.500 | 10.000 | 11.000 | 8.000 | 9.000 | 8.000 | 9.000 | 8.500 | 9.000 | 8.500 | 9.000 |
| Exit time (s) | 49.000 | 59.000 | 53.000 | 66.000 | 40.000 | 45.000 | 47.000 | 54.000 | 44.000 | 50.000 | 44.000 | 50.000 |
| Density (kg/m3) | 48.800 | 48.700 | 49.900 | 49.600 | 49.000 | 48.700 | 48.200 | 48.500 | 49.100 | 48.900 | 47.800 | 47.800 |
| FTC (50%, N) | 896.000 | 481.000 | 710.000 | 514.000 | 885.000 | 680.000 | 881.000 | 684.000 | 843.000 | 615.000 | 1138.000 | 594.000 |
| ILD (50%, N) | 435.000 | 455.000 | 401.000 | 427.000 | 378.000 | 393.000 | 389.000 | 440.000 | 450.000 | 450.000 | 627.000 | 632.000 |

Blocking percentage of catalysts C-3 to C-7
Catalyst C-2 = bis(2-Dimethylaminoethyl)ether
Catalyst C-3 = Dimethylaminoethanol
Catalyst C-4 = Tetramethylimino-bis(propylamine)
Catalyst C-5 = N,N-Dimethylaminopropylamine
Catalyst C-6 = Dimethylaminaethoxyethanal
Catalyst C-7 = N,N,N',N',N"-Pentamethyldiproplenetriamine

EXAMPLES 16–17

Examples 16 and 17 (Table 3) presents the results of using an acid-blocked amine delayed action catalyst of the present invention for making a free rise (slabstock) foam. Again, phenoxyacetic acid was used as the phenoxy acid for preparing the amine catalyst of the invention; while acetic acid was used to make the control catalysts. Consistent with the results obtained in the previous examples involving the preparation of molded foam, the amine catalyst of the invention provided an increase in cream time and rise time for the free rise foam relative to that obtained using the control catalyst. Similar improvements were also observed in foam openness, i.e. Shrinkage and hardness.

TABLE 3

| Examples | 16 | 17 |
|---|---|---|
| Polymer polyol (OH 30) | 100.000 | 100.000 |
| Water | 2.650 | 2.650 |
| DEOA | 1.200 | 1.200 |
| Catalyst C-2 | 0.150 | 0.150 |
| Stannous Octoate | 0.250 | 0.250 |
| Acetic acid | 0.034 | — |
| Phenoxyacetic acid | — | 0.086 |
| Blocking percentage | 30.000 | 30.000 |
| Silicone surfactant | 0.700 | 0.700 |
| TDI 80/20 (Index) | 114.000 | 114.000 |
| Cream time (s) | 4.000 | 5.000 |
| Rise time (s) | 90.000 | 100.000 |
| Top collapse (cm) | 1.600 | 1.600 |
| Density (kg/m3) | 32.000 | 32.600 |
| Ball Rebound (Resilience %) | 53.000 | 52.000 |
| Air flow (NOPCO, before crushing) | 0.300 | 0.300 |
| Air flow (NOPCO, after crushing) | 4.400 | 4.600 |
| CFD 25%, Kpa | 3.380 | 3.600 |
| CFD 40%, Kpa | 4.160 | 4.460 |
| CFD 65%, Kpa | 8.620 | 9.490 |

The principles, preferred embodiments and modes of operation of the present invention have been described in the foregoing specification. The invention which is intended to be protected herein, however, is not to be construed as limited to the particular forms disclosed, since they are to be regarded as illustrative rather than restrictive. Variations and changes may be made by those skilled in the art without departing from the spirit of the invention.

We claim:

1. A process for preparing polyurethane foam by reacting a polyisocyanate and an active hydrogen-containing component, including water and an organic polyol, in the presence of a delayed action amine catalyst, said delayed action amine catalyst consisting of the reaction between a tertiary amine and a carboxylic acid, which is characterized by using as said carboxylic acid an aryloxy substituted carboxylic acid.

2. The process of claim 1 wherein the aryloxy substituted carboxylic acid has the formula:

$$(X)_n\text{—R—}(COOH)_m$$

wherein R is an optionally hyldroxyl substituted, at least divalent hydrocarbon moiety, X is an optionally substituted aryloxy group, m and n are integers each separately having a value of at least 1.

3. The process of claim 2 wherein the optionally substituted aryloxy group has the formula Ar—O— where Ar is an optionally substituted phenyl or naphthyl optionally substituted at one or more substitutable positions with a moiety selected from the group consisting of an alkoxy; a carboxyl; hydroxyl; a halogen selected from chlorine, bromine, fluorine and combinations thereof, an alkyl optionally substituted with a moiety selected from the group consisting of an alkoxy; a carboxyl; hydroxyl; a halogen selected from chlorine, bromine, fluorine and combinations thereof; and a phenyl optionally substituted with a moiety selected from the group consisting of an alkoxy; a carboxyl; hydroxyl; a halogen selected from chlorine, bromine, fluorine and combinations thereof.

4. The process of claim 2 wherein said tertiary amine is selected from the group consisting of dimethylaminoethanol, dimethylalminoethoxyethanol, triethyl amine, N,N-dimethylcyclohexylamine, N,N,N',N'-tetramethylethylenediamine, N,N-dimethylaminopropylamine, N,N,N',N',N"-pentamethyldipropylene-triamine, tris(3-dimethylaminopropyl)amine, N,N-dimethylpiperazine, tetramethylimino-bis(propylamine), dimethylbenzylamine, trimethylamine, triethanolamine, N-diethyl-ethanolamine, N-methylpyrrolidone, N-vinyl-pyrrolidone, N-methylmorpholine, N-ethylmorpholine, bis(2-dimethylamino-ethyl)ether, N,N,N',N',N"-pentamethyl-diethylenetriamine, 1,4-diazabicyclo[2.2.2]octane, 1,8-diaza[5.4.0]bicycloundec-7-ene, 1,2-dimethylimidazol, 3-(dimethylamino)propylimidazol and mixtures thereof.

5. The process of claim 2 wherein said optionally hydroxyl substituted, at least divalent hydrocarbon moiety is selected from the group consisting of an optionally hydroxyl substituted linear aliphatic hydrocarbon moiety, an optionally hydroxyl substituted branched aliphatic hydrocarbon moiety, an optionally hydroxyl substituted alicyclic aliphatic hydrocarbon moiety and an optionally hydroxyl substituted aromatic hydrocarbon moiety.

6. The process of claim 2 wherein said aryloxy substituted carboxylic acid is selected from the group consisting of phenoxyacetic acid, (dichlorophenoxy)acetic acid, phenoxybenzoic acid, chloromethylphenoxyacetic acid, 5-(4-hydroxymethyl-3-methoxyphenoxy)valeric acid, naphthoxyacetic acid, 4-hydroxymethyl phenoxyacetic acid, 3-(4-hydroxymethyl-phenoxy)propionic acid, phenoxy butyric acid, 2-(4-hydroxymethyl-3-methoxy phenoxy) butyric acid, 4-(4-hydroxymethyl-3-methoxyphenoxy) butyric acid, [4-(4-hydroxymethyl-3-methoxyphenoxyacetic] 4-hydroxymethyl-3-methoxyphenoxyacetic acid and mixtures thereof.

7. The process of claim 6 wherein said reactions are conducted in the presence of a polyurethane foam additive selected from the group consisting of an amine catalyst, an organo-metallic catalyst, a metal salt catalyst, a crosslinker, a silicone surfactant, an organic blowing agent and mixtures thereof.

8. The process of claim 2 wherein said aryloxy substituted carboxylic acid having optional hydroxyl functionality is 2-phenoxyacetic acid.

9. The process of claim 2 wherein the reactions are conducted in the presence of a crosslinker.

10. The process of claim 2 wherein the reactions are conducted in the presence of a carbon dioxide as a blowing agent.

11. The process of claim 2 wherein more than one tertiary amine is present.

12. A process for preparing a polyurethane foam by reacting a polyisocyanate and an active hydrogen-containing component, including water and an organic polyol, in the presence of a delayed amine catalyst, said delayed amine catalyst formed in situ consisting of a tertiary amino and an aryloxy substituted carboxylic acid to form a catalyst mixture, and adding said catalyst mixture to said hydrogen-containing component, including water and said organic polyol.

13. The process of claim 12 wherein said polyisocyanate is reacted with said hydrogen-containing component, including water and said organic polyol, after said catalyst mixture is added to said hydrogen-containing component, water and said organic polyol.

14. A process for preparing a polyurethane foam by reacting a resin premix comprising an organic polyol, a tertiary amine, and water, with a phenoxy acid selected from the group consisting of phenoxyacetic acid, (dichlorophenoxy)acetic acid, phenoxybenzoic acid, chloromethylphenoxyacetic acid, 5-(4-hydroxymethyl-3-methoxyphenoxy) valeric acid, naphthoxyacetic acid, 4-hydroxymethyl phenoxyacetic acid, 3-(4-hydroxymethyl-phenoxy)propionic acid, phenoxy butyric acid, 2-(4hydroxymethyl-3-methoxy phenoxy)butyric acid, 4-(4-hydroxymethyl-3-methoxyphenoxy) butyric acid, 4-hydroxymethyl-3-methoxyphenoxyacetic acid and mixtures thereof, followed by addition of a polyisocyanate such that a reaction product of the tertiary amine and the phenoxy acid generates a delayed action catalyst to delay the onset of a reaction between said polyisocyanate, water, and said organic polyol.

* * * * *